United States Patent
O'Driscoll et al.

(10) Patent No.: US 11,297,017 B2
(45) Date of Patent: *Apr. 5, 2022

(54) SYSTEM AND METHOD FOR PROVIDING DIGITAL MEDIA CONTENT WITH A CONVERSATIONAL MESSAGING ENVIRONMENT

(71) Applicant: SPOTIFY AB, Stockholm (SE)

(72) Inventors: Brendan O'Driscoll, San Francisco, CA (US); Matthew Montag, San Francisco, CA (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,398

(22) Filed: Jan. 25, 2021

(65) Prior Publication Data

US 2021/0152497 A1  May 20, 2021

Related U.S. Application Data

(63) Continuation of application No. 15/611,506, filed on Jun. 1, 2017, now Pat. No. 10,904,168.

(Continued)

(51) Int. Cl.
*H04L 12/58* (2006.01)
*H04L 29/06* (2006.01)
(Continued)

(52) U.S. Cl.
CPC ............ *H04L 51/02* (2013.01); *H04L 51/046* (2013.01); *H04L 65/60* (2013.01)

(58) Field of Classification Search
CPC ....... H04L 51/02; H04L 51/046; H04L 67/10; H04L 65/4084; H04L 65/60; H04L 67/20;
(Continued)

(56) References Cited

U.S. PATENT DOCUMENTS 9,219,736 B1   12/2015 Lewis et al.
9,323,916 B1 *  4/2016 Wu ......................... G06F 21/44
(Continued)

OTHER PUBLICATIONS

O'Driscoll, Office Action, U.S. Appl. No. 15/611,506, dated Dec. 6, 2018, 19 pgs.

(Continued)

*Primary Examiner* — Tonia L Dollinger
*Assistant Examiner* — Linh T. Nguyen
(74) *Attorney, Agent, or Firm* — Morgan, Lewis & Bockius LLP

(57) ABSTRACT

In accordance with an embodiment, described herein is a system and method for providing access to digital media content within a conversational messaging environment, through the use of a conversational agent, generally referred to as a "bot". A media content bot leverages a user's interaction with the bot, to access a media server, which in turn can determine one or more recommended items of media content that are appropriate for the user and/or their interaction. The recommended media content can be provided to the user, or to a media device, in the form of a link, playlist, or other type of reference by which the user can stream, download, access, or otherwise use the recommended media content. In accordance with various embodiments, the media content bot and media server can support atypical or other user inputs in addition to text inputs, for example the use of emojis, and respond accordingly.

15 Claims, 6 Drawing Sheets

Related U.S. Application Data

(60) Provisional application No. 62/345,679, filed on Jun. 3, 2016.

(51) Int. Cl.
- H04L 51/02 (2022.01)
- H04L 65/60 (2022.01)
- H04L 51/046 (2022.01)

(58) Field of Classification Search
CPC ............ H04L 63/0876; H04L 63/0884; H04L 65/403; G06Q 30/0631; H04W 12/084
See application file for complete search history.

(56) References Cited

U.S. PATENT DOCUMENTS

| | | | |
|---|---|---|---|
| 2007/0271519 A1 | 11/2007 | Hu et al. | |
| 2008/0209322 A1 | 8/2008 | Kaufman | |
| 2009/0281966 A1* | 11/2009 | Biggs | G06F 16/951 706/11 |
| 2009/0298418 A1* | 12/2009 | Michael | H04N 5/44543 455/3.04 |
| 2011/0078228 A1* | 3/2011 | Bristol | H04L 51/04 709/202 |
| 2011/0142016 A1 | 6/2011 | Chatterjee | |
| 2013/0346234 A1 | 12/2013 | Hendrick et al. | |
| 2014/0173648 A1 | 6/2014 | Ball et al. | |
| 2014/0298364 A1* | 10/2014 | Stepanov | H04N 21/4758 725/10 |
| 2014/0379823 A1 | 12/2014 | Wilsher et al. | |
| 2015/0189391 A1* | 7/2015 | Lee | H04L 63/105 709/229 |
| 2016/0048901 A1 | 2/2016 | Bax et al. | |
| 2017/0052946 A1 | 2/2017 | Gu et al. | |
| 2017/0244652 A1 | 8/2017 | Clarke | |
| 2017/0250930 A1* | 8/2017 | Ben-Itzhak | G06F 3/011 |
| 2017/0279906 A1* | 9/2017 | Laird-McConnell | H04L 67/306 |
| 2017/0291295 A1 | 10/2017 | Gupta et al. | |
| 2017/0337209 A1 | 11/2017 | Schaer et al. | |
| 2018/0025090 A1 | 1/2018 | Lu et al. | |
| 2018/0152411 A1* | 5/2018 | Lee | G06Q 10/107 |

OTHER PUBLICATIONS

O'Driscoll, Final Office Action, U.S. Appl. No. 15/611,506, dated Oct. 10, 2019, 26 pgs.

O'Driscoll, Advisory Office Action, U.S. Appl. No. 15/611,506, dated Jan. 21, 2020, 5 pgs.

O'Driscoll, Notice of Allowance, U.S. Appl. No. 15/611,506, dated Aug. 7, 2020, 14 pgs.

O'Driscoll, Notice of Allowance, U.S. Appl. No. 15/611,506, dated Sep. 25, 2020, 14 pgs.

"Chatterbot", Wikipedia, retrieved from https://en.wikipedia.org/wiki/Chatterbot on May 11, 2016, 5 pages.

Facebook Messenger, Wikipedia, retrieved from https://en.wikipedia.org/wiki/Facebook_Messenger on May 11, 2016, 2 pages.

Grover, Dan; "Bots won't replace apps. Better apps will replace apps.", published Apr. 20, 2016, retrieved from http://dangrover.com/blog/2016/04/20/bots-wont-replace-apps.html on May 11, 2016, 19 pages.

"Product Overview", Messenger Platform, retrieved from https://developers.facebook.com/docs/messenger-platform/product-overview on May 11, 2016, 4 pages.

Quoc, Michael; "11 Examples of Conversational Commerce and Chatbots", published May 31, 2016 at https://chatbotsmagazine.com/11-examples-of-conversational-commerce-57bb8783d332, 20 pages.

"Server-side architecture when bots invade", Medium, retrieved from https://medium.com/@JonathanZWhite/server-side-infrastructure-when-bots-invade-a2252e9d4bc9#.63mlj6t1j on May 11, 2016, 16 pages.

* cited by examiner

SYSTEM AND METHOD FOR PROVIDING DIGITAL MEDIA CONTENT WITH A CONVERSATIONAL MESSAGING ENVIRONMENT

CLAIM OF PRIORITY

This application is a continuation of U.S. Patent Application titled "SYSTEM AND METHOD FOR PROVIDING DIGITAL MEDIA CONTENT WITH A CONVERSATIONAL MESSAGING ENVIRONMENT", application Ser. No. 15/611,506, filed Jun. 1, 2017; which claims the benefit of priority to U.S. Provisional Patent Application titled "SYSTEM AND METHOD FOR PROVIDING DIGITAL MEDIA CONTENT WITH A CONVERSATIONAL MESSAGING ENVIRONMENT", Application No. 62/345,679, filed Jun. 3, 2016; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Today's consumers enjoy the ability to access a tremendous amount of media content, such as music and videos, using a wide variety of media devices. Digital media content environments, for example those provided by media streaming services such as Spotify, are ideally suited to delivering media content to users in a way that addresses the individual preferences of each user. To accomplish this, any user feedback or other input provided by the user is helpful in determining the appropriate media content for that user. These are some examples of the types of environments in which embodiments of the invention can be used.

SUMMARY

In accordance with an embodiment, described herein is a system and method for providing access to digital media content within a conversational messaging environment, through the use of a conversational agent, generally referred to as a "bot". A media content bot leverages a user's interaction with the bot, to access a media server, which in turn can determine one or more recommended items of media content that are appropriate for the user and/or their interaction. The recommended media content can be provided to the user, or to a media device, in the form of a link, playlist, or other type of reference by which the user can stream, download, access, or otherwise use the recommended media content. In accordance with various embodiments, the media content bot and media server can support atypical or other user inputs in addition to text inputs, for example the use of emojis, and respond accordingly.

DETAILED DESCRIPTION

As described above, digital media content environments, for example those provided by media streaming services such as Spotify, are ideally suited to delivering media content to users in a way that addresses the individual preferences of each user. To accomplish this, any user feedback or other input is helpful in determining the appropriate media content for that user.

In accordance with an embodiment, described herein is a system and method for providing access to digital media content within a conversational messaging environment, through the use of a conversational agent, generally referred to as a "bot". A media content bot leverages a user's interaction with the bot, to access a media server, which in turn can determine one or more recommended items of media content that are appropriate for the user and/or their interaction. The recommended media content can be provided to the user, or to a media device, in the form of a link, playlist, or other type of reference by which the user can stream, download, access, or otherwise use the recommended media content.

In accordance with various embodiments, the media content bot and media server can support atypical or other user inputs in addition to text inputs, for example the use of emojis, and respond accordingly.

Digital Media Content Environments

Figure 1:
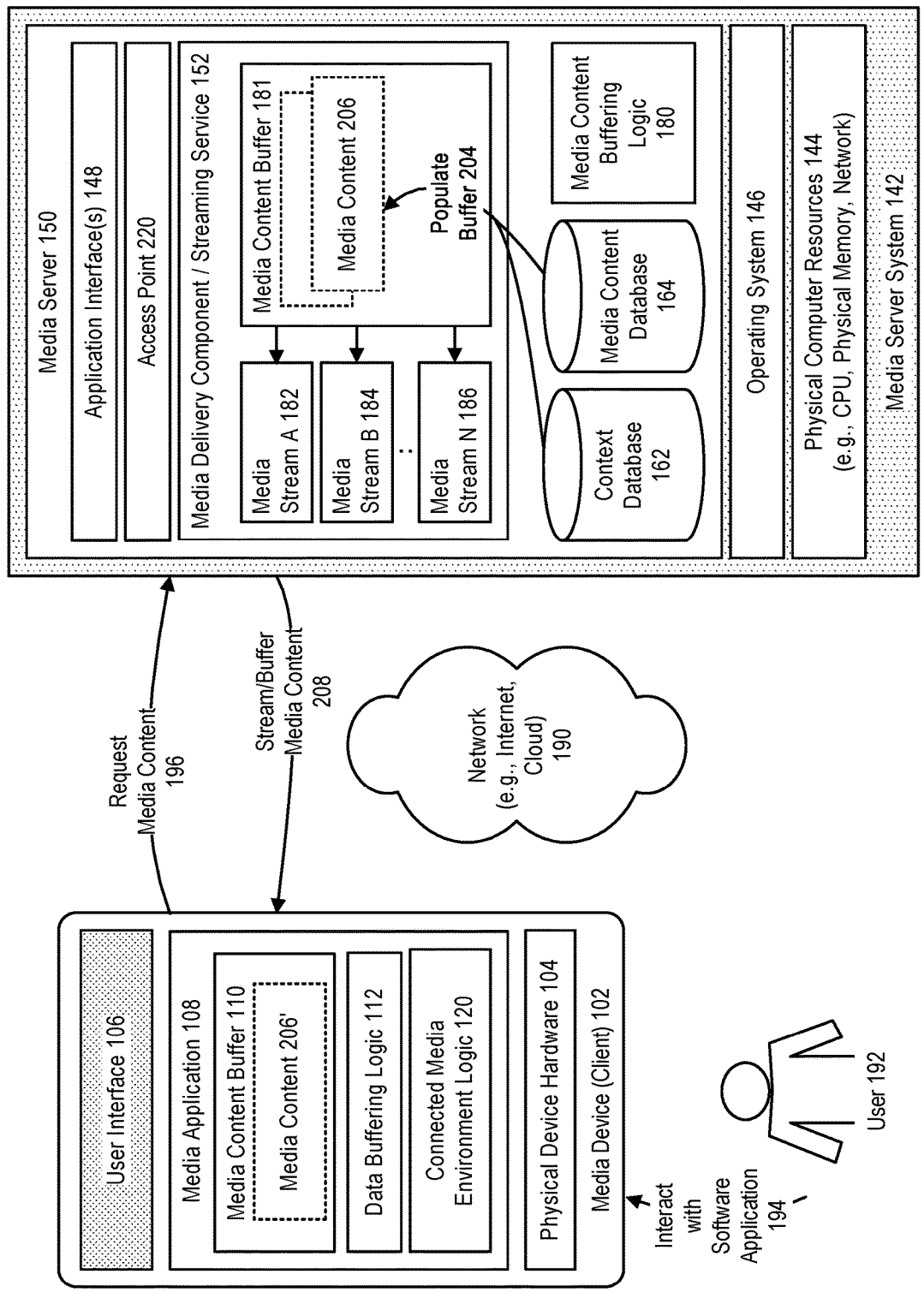
FIG. 1 illustrates an exemplary digital media content environment, in accordance with an embodiment.

FIG. 1 illustrates an exemplary digital media content environment, in accordance with an embodiment.

As illustrated in FIG. 1, in accordance with an embodiment, a media device 102, operating as a client device, can receive and play media content provided by a media server system 142 (media server), or by another system or peer device. In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources.

Although, for purposes of illustration, a single client media device and media server are shown, in accordance with an embodiment a media server can support the simultaneous use of a plurality of client media devices. Similarly, in accordance with an embodiment, a client media device can access media content provided by a plurality of media servers, or switch between different media streams produced by one or more media servers.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application 108, together with an in-memory client-side media content buffer 110, and a client-side data buffering logic or software component 112, which can be provided as software or program code that is executable by a computer system or other processing device, and which can be used to control the playback of media content received from the media server, for playing either at a requesting media device (i.e., controlling device) or at a controlled media device (i.e., controlled device), in the manner of a remote control.

In accordance with an embodiment, a connected media environment logic or software component 120, which can be provided as software or program code that is executable by a computer system or other processing device, can be provided at the media device, either as part of the media application, or separately, for example as a firmware, to enable the media device to participate within a connected media environment (e.g., a Spotify Connect environment) that enables a user to control the playback of media content at such controlled devices.

In accordance with an embodiment, the client-side data buffering logic, together with the media content buffer, enables a portion of media content items, or samples thereof, to be pre-buffered at a client media device. For example, while media options are being prepared for display on a user interface, e.g., as media tiles or thumbnails, their related media content can be pre-buffered at the same time, and cached by one or more media devices in their media content buffers, for prompt and efficient playback when required.

In accordance with an embodiment, the media server can include an operating system 146 or other processing environment which supports execution of a media server 150 that can be used, for example, to stream music, video, or other forms of media content to a client media device, or to a controlled device.

In accordance with an embodiment, the media server can provide a subscription-based media streaming service, for which a client media device or user can have an associated account and credentials, and which enable the user's media device to communicate with and receive content from the media server. A received media-access request from a client media device can include information such as, for example, a network address, which identifies a destination media device to which the media server should stream or otherwise provide media content, in response to processing the media-access request.

For example, a user may own several media devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences. The media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination media device to which the media content is being streamed changes, say from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client media devices to search within repositories of media content, to locate particular media content items.

In accordance with an embodiment, a server-side media content buffering logic or software component 180, which can be provided as software or program code that is executable by a computer system or other processing device, can be used to retrieve or otherwise access media content items, in response to requests from client media devices or other systems, and to populate a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. For example, a user 192 can interact 194 with the user interface at a client media device, and issue requests to access media content, for example the playing of a selected music or video item at their device, or at a controlled device, or the streaming of a media channel or video stream to their device, or to a controlled device.

In accordance with an embodiment, the user's selection of a particular media option can be communicated 196 to the media server, via the server's application interface. The media server can populate its server-side media content buffer at the server 204, with corresponding media content, 206 including one or more streams of media content data, and can then communicate 208 the selected media content to the user's media device, or to a controlled device as appropriate, where it can be buffered in a client-side media content buffer for playing at the device.

In accordance with an embodiment, and as further described below, the system can include a server-side media gateway or access point 220, provided as software or program code that is executable by a computer system or other processing device, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to various Spotify back-end processes via a Spotify "access-point", which forwards client requests to other servers, such as sending one or more metadataproxy requests to one of several metadataproxy machines, on behalf of the client or end user.

Conversational Messaging Environments

In accordance with an embodiment as described herein, a conversational messaging environment is generally a computer-based environment which can be accessed online or via a network, and which supports the use of a software conversational agent, sometimes referred to as "chatterbot" or "bot". The bot enables a conversation-like interaction with a user, and, during the interaction between the user and the bot, simulates how a human participant might respond or otherwise behave as a conversational partner in response to input from the user.

Bots can be provided in a variety of computer-based environments and use cases, for example as part of an Internet-based sales or customer service environment, and can vary in their complexity of execution.

For example, depending on the particular use case, a bot can be configured to simply scan for particular keywords within a text received as user input during a conversation with the bot, and then respond accordingly to those keywords.

Alternatively, a bot can be configured to employ a form of natural language processing (NLP), to extract semantic or other useful information from the conversational text, and provide a more complex response. For example, the bot can leverage an NLP library or engine, such as the wit.ai bot engine, which effectively converts a natural language input into a structured data.

Examples of conversational messaging environments which support the use of bots include Facebook Messenger, which provides an instant messaging service that enables text and voice communication by a user, and which integrates with other features of the Facebook environment. The Messenger environment claims to support approximately 900 million monthly active users, and includes a Messenger Platform functionality which allows third-party software developers to create bots that provide other functionalities, which can then be provided to and interact with users within the Messenger environment.

Use of Media Content with Conversational Messaging Environments

In accordance with an embodiment, access to digital media content can be provided within a conversational messaging environment, through the use of a media content bot, which leverages a user's interaction with the bot, to access a media server, which in turn can determine one or more recommended items of media content that are appropriate for the user and/or their interaction.

The recommended media content can be provided to the user, or to a media device, in the form of a link, playlist, or other type of reference by which the user can stream, download, access, or otherwise use the recommended media content.

Figure 2:
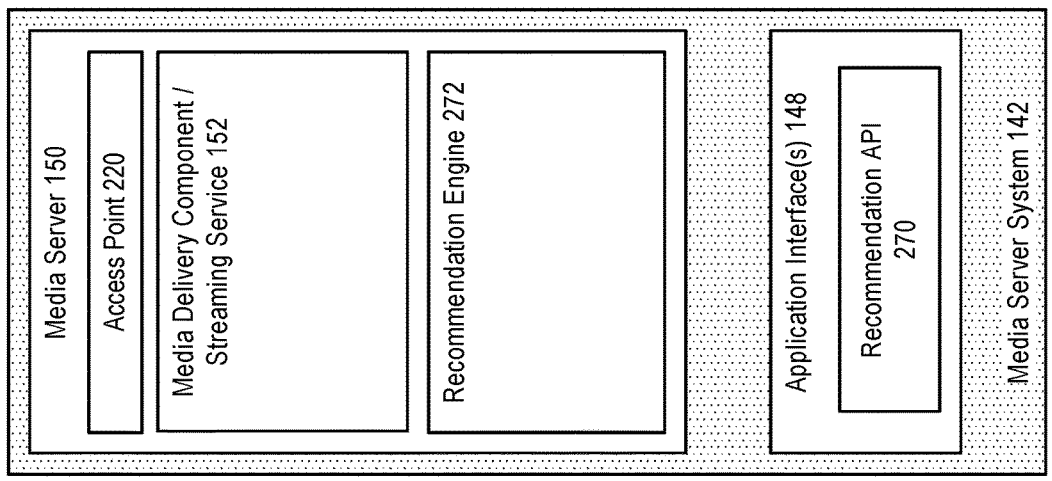
FIG. 2 illustrates the use of media content with a conversational messaging environment, in accordance with an embodiment.
Figure 2:
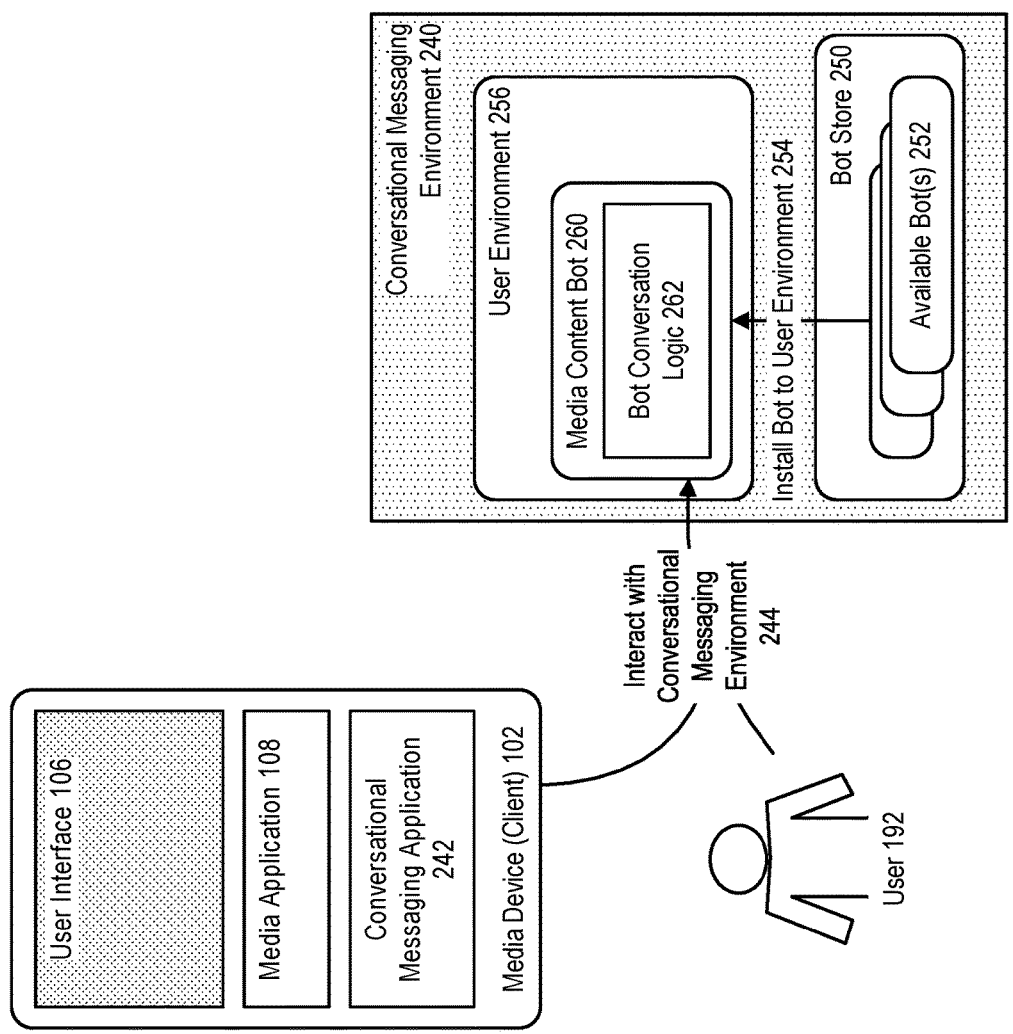

FIG. 2 illustrates the use of media content with a conversational messaging environment, in accordance with an embodiment.

As illustrated in FIG. 2, in accordance with an embodiment, a conversational messaging environment 240 enables a conversational messaging application 242 to be used by a user, to interact with the conversational messaging environment 244. As described above, examples of conversational messaging environments include Facebook Messenger.

In accordance with an embodiment, the conversational messaging environment can provide a bot store 250, which operates as a shelf of one or more available bot(s) 252, which can be selected and installed 254 by a user, to their user environment 256.

For example, in accordance with an embodiment, the store of available bots can include a media content bot 260, which includes and operates according to a bot conversation logic 262. Once installed, the media content bot can be used to provide access to a media content environment, from within a conversational messaging environment.

As further illustrated in FIG. 2, in accordance with an embodiment, the media server can include an application program interface (API), for example a recommendation API 270, which is accessible, e.g., via a HTTP URL, and which provides access to a recommendation engine 272, which in turn, as described in further detail below, can be used to provide media content recommendations in response to interactions or conversations with the media content bot.

Figure 3:
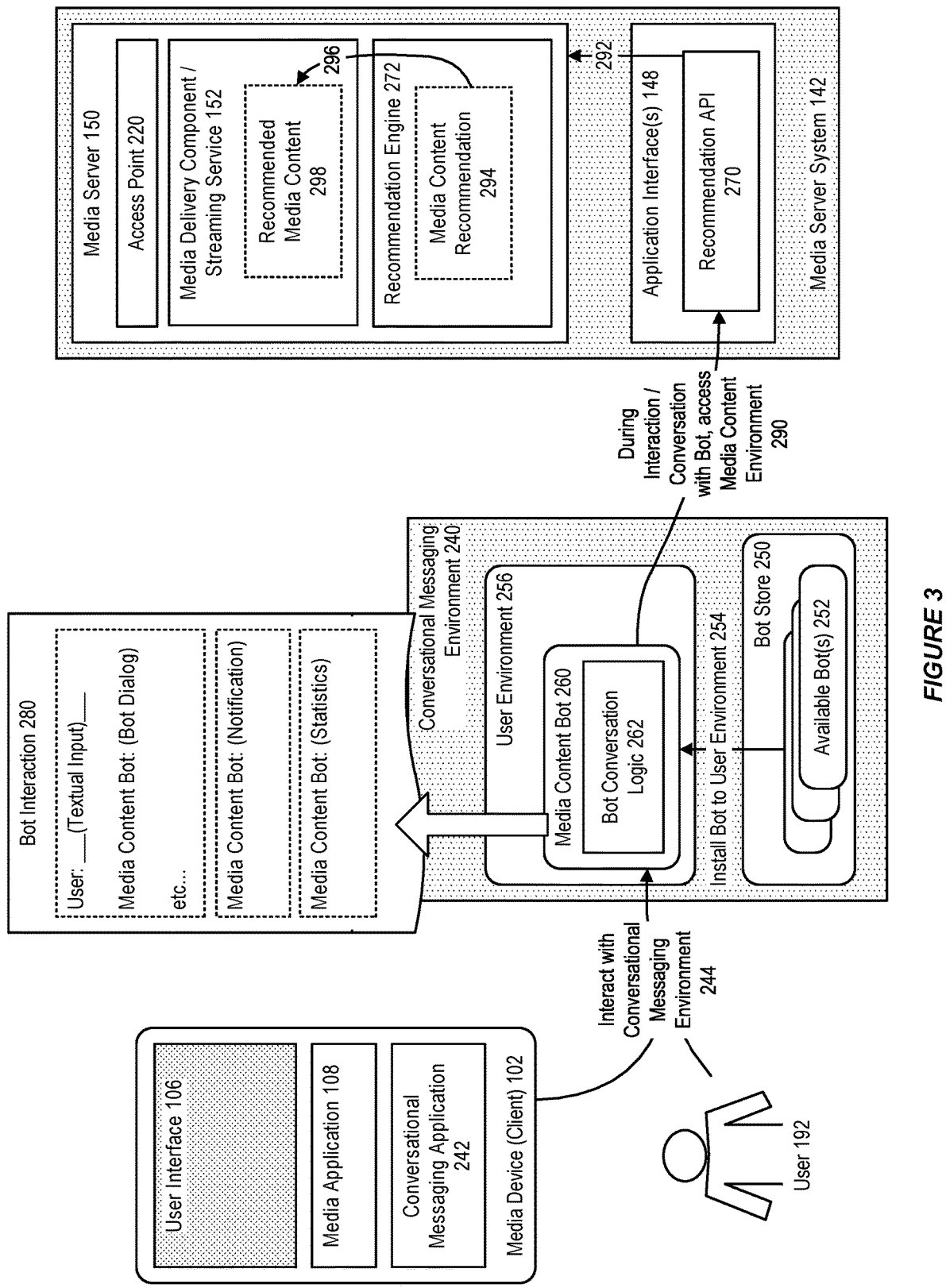
FIG. 3 further illustrates the use of media content with a conversational messaging environment, in accordance with an embodiment.

FIG. 3 further illustrates the use of media content with a conversational messaging environment, in accordance with an embodiment.

As illustrated in FIG. 3, in accordance with an embodiment, the media content bot enables a bot interaction 280 by the user with the bot. Depending on how the media content bot is configured, it can act in a reactive manner, awaiting input from a user, or can act proactively, sending messages to the user in the manner of a push-notification.

In accordance with an embodiment, during the interaction with the media content bot, the bot can access the media content environment 290, via the recommendation API, and provide interaction information 292, to the recommendation engine, for its use in determining a media content recommendation 294, and, if appropriate, populating 296 the media delivery component or streaming service with the appropriate recommended media content 298.

Figure 4:
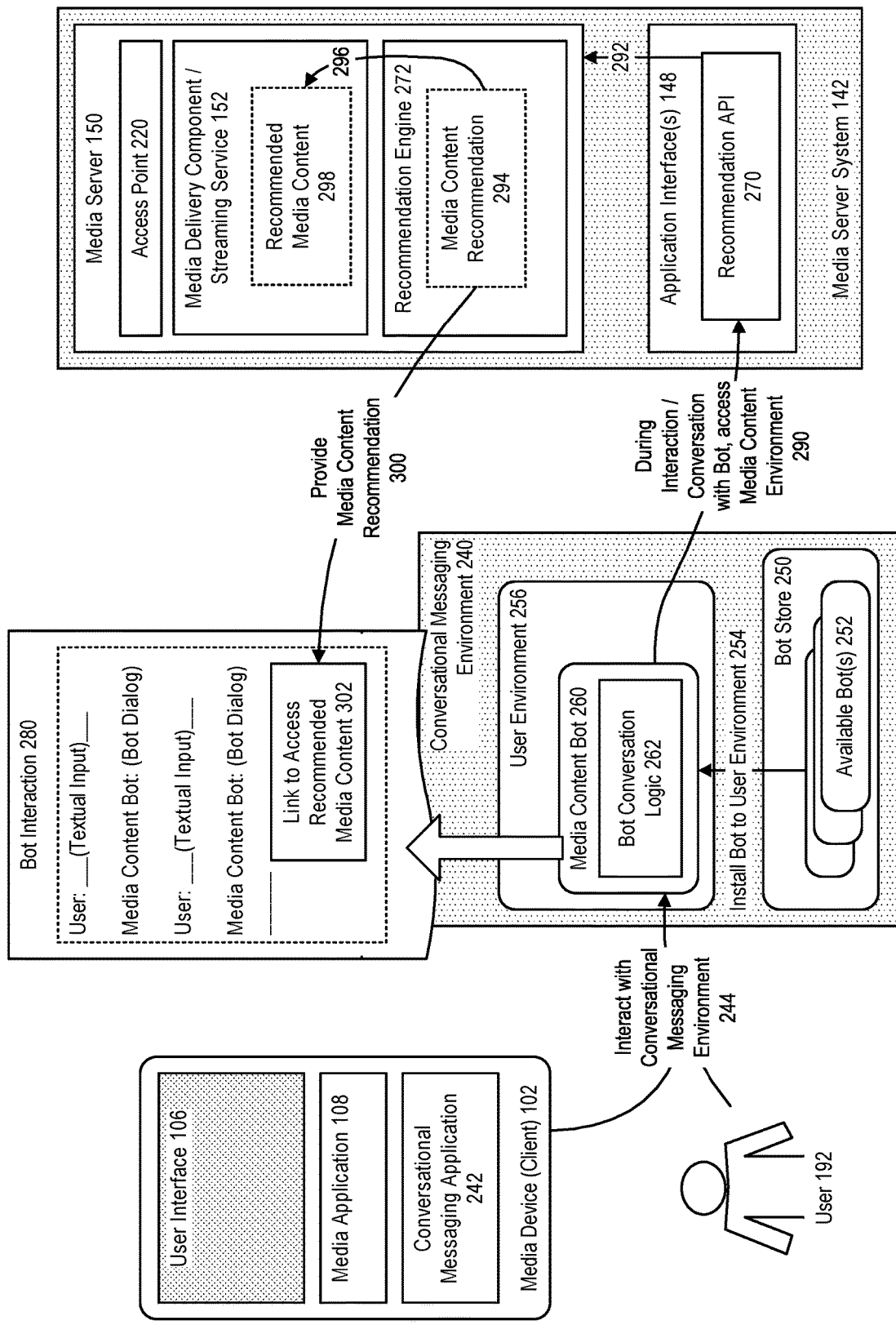
FIG. 4 further illustrates the use of media content with a conversational messaging environment, in accordance with an embodiment.

FIG. 4 further illustrates the use of media content with a conversational messaging environment, in accordance with an embodiment.

As illustrated in FIG. 4, in accordance with an embodiment, at appropriate points during a conversation by the user with the media content bot, and in response to communicating the interaction information via the recommendation API, as input to the recommendation engine, the media server can return 300 to the media content bot, as part of the conversation or other interaction with the user, a media content recommendation 302, in the form of a link, playlist, or other type of reference by which the user can stream, download, access, or otherwise use the recommended media content.

Figure 5:
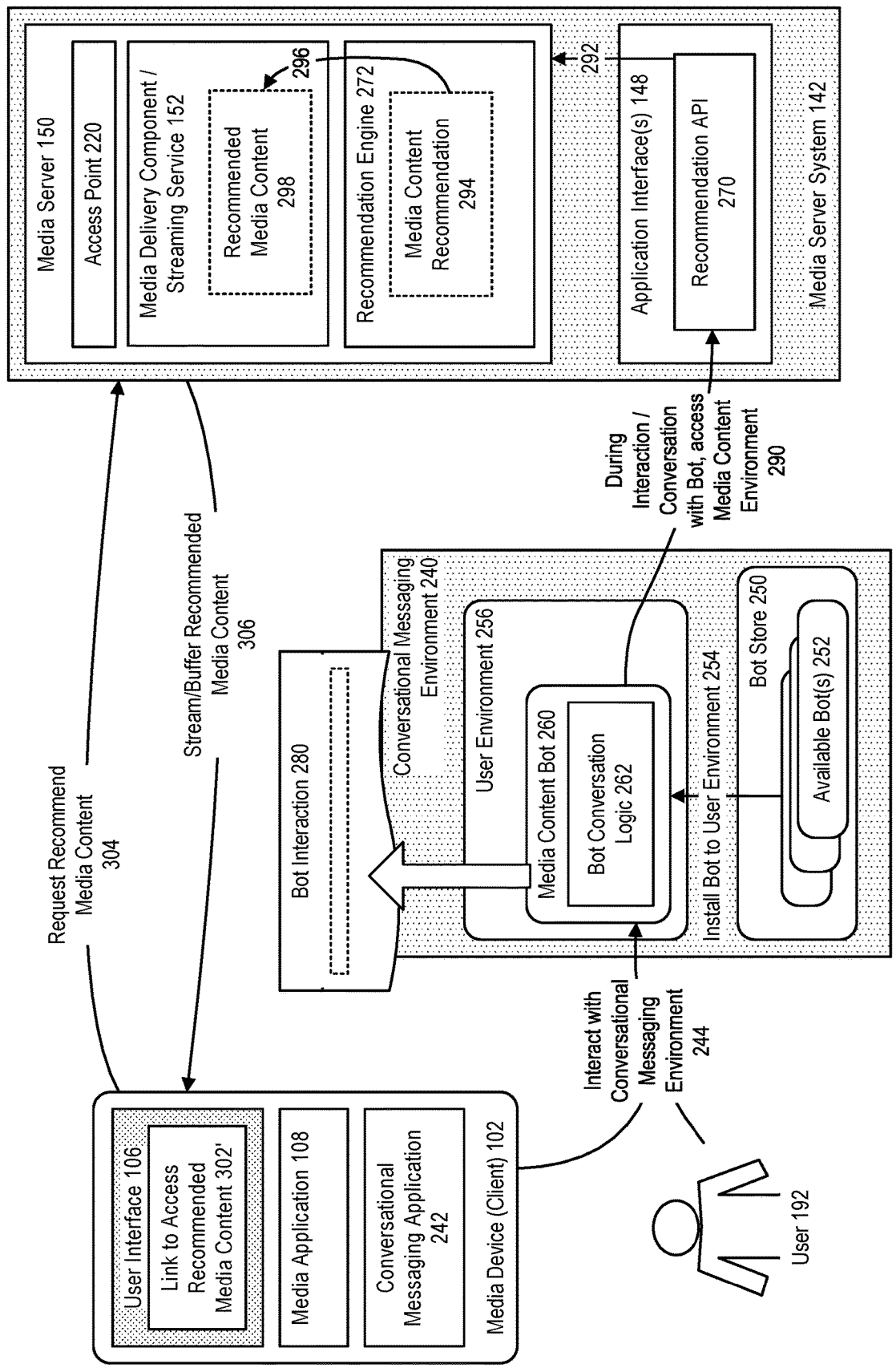
FIG. 5 further illustrates the use of media content with a conversational messaging environment, in accordance with an embodiment.

FIG. 5 further illustrates the use of media content with a conversational messaging environment, in accordance with an embodiment.

As illustrated in FIG. 5, in accordance with an embodiment, once the link, playlist, or other type of reference to access the recommended media content has been returned to the user as part of the interaction, it can be processed in the usual manner by the user's media device, to request 304, that the recommended media content be returned either to the media device or to a controlled device, for playback at that device.

In response to receiving such a request, the media server can stream or buffer the recommended media content 306.

For example, the media content bot can be configured to parse a stream of input text for, e.g., an artist name, such as the user indicating "My favorite artist is Rihanna". The artist name can be passed from the media content bot to the recommendation API. The resultant information received from the recommendation API can be in the manner of a conversation, e.g. "Thanks, do you want to hear some new tracks from Rihanna?", and can return a link, playlist, or other type of reference to that item of media content, for example, as:

https://open.spotify.com/track/
01G6a8O85SXIH05upiDN1N

Playing the Media Content

As described above, in accordance with an embodiment, the media server can return, as part of a conversation with a user, a media content recommendation, to the media content bot, to be included as a link, playlist, or other type of reference to access the recommended media content.

In accordance with an embodiment, the media content bot can operate anonymously, or can perform an authentication or account verification, for example, to indicate the user as a Spotify user. Depending on how the bot is configured, when a link, playlist, or other type of reference to an item of media content, is returned to a user's media device, the device can be either directed to a landing page, e.g., in a Web browser, or a device application (app); and either request the user to log in, or play the songs anonymously without requiring a login.

In accordance with an embodiment, when the media content bot is provided within the context of a connected media environment, such as the example described above, the bot can also prompt the user, for example, whether the recommended media content should be played on the user's media device, or at another, e.g., controlled device.

Example Recommendation API Functions

As described above, in accordance with an embodiment, the media server can include an application program interface (API), for example a recommendation API, which provides access to a recommendation engine, and which as described in further detail below, can be used to provide media content recommendations in response to interactions or conversations with the media content bot.

In accordance with various embodiments, other types of APIs can be used, to provide other types of functionality, including providing recommendations based on various criteria, or to address other use cases, for example:

Create a playlist from an artist: (for example, as accessible by a URL at http://static.echonest.com/enspex/web/ArtistBrowser/), which, provided an interaction information input of a seed artist, returns an indication of similar artists.

Create a set list playlist: (for example, as accessible by a URL at http://static.echonest.com/SetListener/), which, provided an interaction information input of a particular artist's show, returns a playlist for that show.

Learn about a genre: (for example, as accessible by a URL at http://static.echonest.com/GenreBrowser/), which, provided an interaction information regarding a particular genre, returns information describing that genre.

Create a seamless playlist between two artists: (for example, as accessible by a URL at http://static.echonest.com/frog/), which, provided an interaction information indicating two artists, returns a playlist reflecting those two artists.

Mixtape of local artists for a road trip: (for example, as described at http://labs.echonest.com/CityServer/roadtrip.html), which, provided an interaction information of geographic starting and ending points, returns a playlist of local artists located between those two points.

Example Notifications

As described above, in accordance with an embodiment, in addition to supporting a conversation-like interaction, the media content bot includes support for providing notifications to the user, that reflect the user's usage of the conversational messaging environment, examples of which can include:

Notification: "Hey, your new Discover Weekly is cooked, and ready for a spin. Here you go:"

(Charts) Notification: "We've a new Number 1 at the top of the global charts. Want to know what it is?"

(1 st song) Notification: "Hey! Did you know that the first track you listened to on Spotify was 'Baby' by Justin Bieber? I promise I won't tell anyone though!"

(Scrape Facebook events) Notification: "I saw you're hitting the "Beach Time" party with your friends this weekend, need a playlist?"

(Scrape concert activity) Notification: "Did you enjoy that concert last night as much as we did? Here's the set list."

Example Statistics

As described above, in accordance with an embodiment, in addition to supporting a conversation-like interaction, the media content bot includes support for providing statistics to the user, that reflect the user's usage of a digital media content environment, examples of which can include:

Top Played: "Did you know you've listened to Rihanna—Diamond more than anyone else in the world? Tweet this (link)?"

1st Played: "Did you know you were the first Spotify user ever to listen to Rihanna—Diamonds. Tweet this (link)?"

"Want to know which artist you've listened to most?"

Support for Emojis

In accordance with various embodiments, the media content bot and media server can support atypical or other user inputs in addition to text inputs, for example the use of emojis, and respond accordingly.

For example, in accordance with an embodiment, when an emoji is sent by a user to the media content bot, and forms part of the interaction information, the bot can return a corresponding song. Different sets of emoji's and songs can be, for example, regional-based, or country-based.

Figure 6:
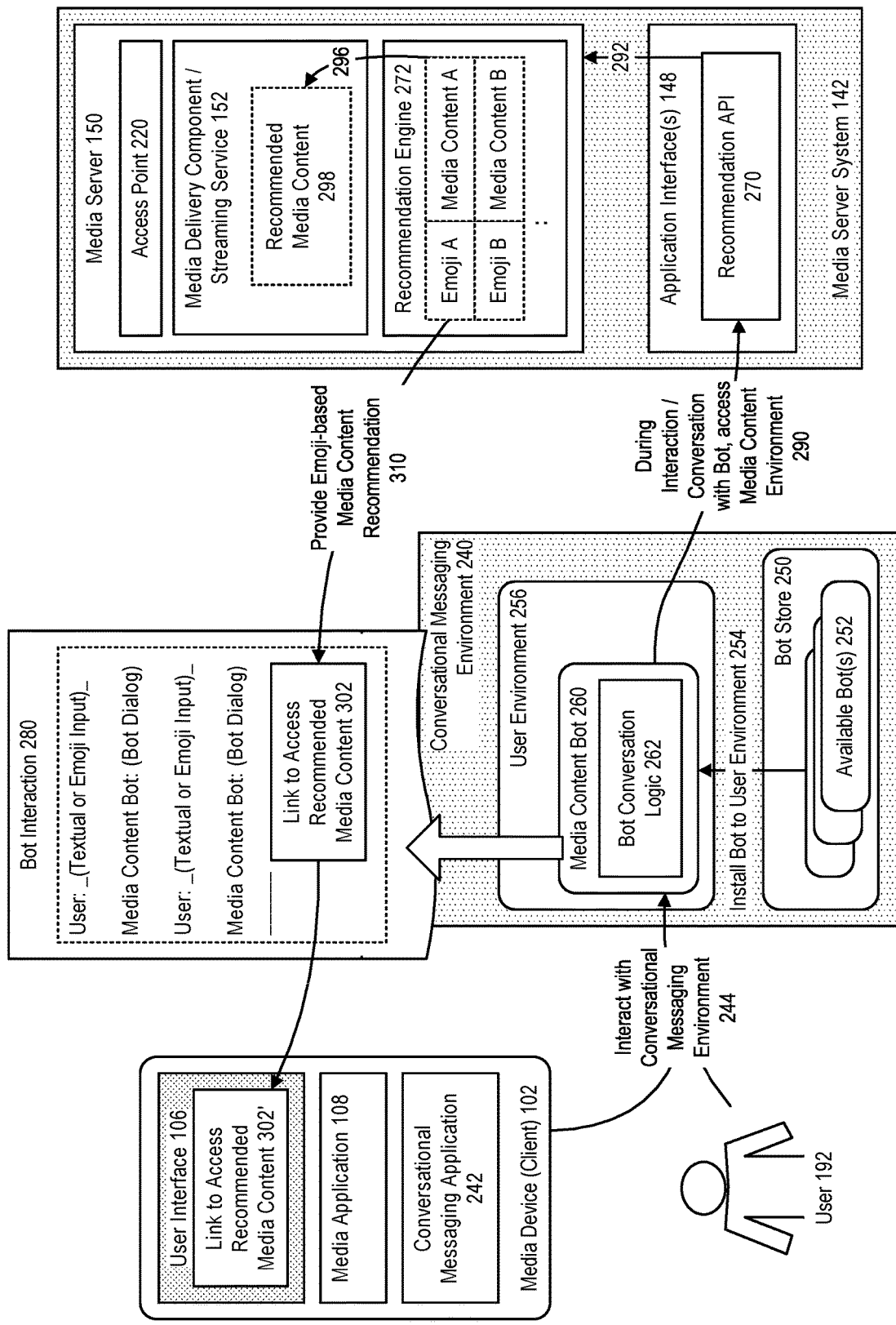
FIG. 6 illustrates the use of media content with a conversational messaging environment, which supports the use of emojis, in accordance with an embodiment.

FIG. 6 illustrates the use of media content with a conversational messaging environment, which supports the use of emojis, in accordance with an embodiment.

As illustrated in FIG. 6, in accordance with an embodiment, the media content bot can recognize emojis, such that the bot interaction can support the use of text or emoji input by the user. The recommendation engine can include or otherwise associate a particular media content item for each particular type of emoji. For example, a first emoji A can be associated with a media content A, such as a particular song, and a second emoji B can be associated with a media content B, such as a different song.

In accordance with an embodiment, as the user interacts with the bot, the system can return emoji-based media content recommendations 310, for subsequent use by the user, for example to playback, forward, or use with other applications.

In accordance with an embodiment, the use of a particular emoji during the interaction by the user with the media content bot, can be used to determine a particular item of media content associated with the particular emoji, for example:

🎵 🍺 ="I Wanna Rock (Doo Doo Brown)" by the Poison Clan

Examples of the types of association that can be considered for each emoji include: tracks that provide a good match (e.g., 👓 ="Eyes Without A Face", by Billy Idol); playlists (e.g., 🎵 =Metalcore playlist provided by Spotify); and albums (e.g., 💊 ="Jagged Little Pill", by Alanis Morissette).

In accordance with an embodiment, emoji's can also be used within a search query.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming service such as Spotify, and streamed music or song content, the systems and techniques described herein can be similarly used with other types of media content environments, and other types of streamed data or media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method of providing access to digital media content within a conversational messaging environment, comprising:
providing a media server which can receive requests from media devices for media content;
providing a conversational agent within a conversational messaging environment, displayed on a first media device, which operates according to a logic adapted to support an interaction with a user;
in response to the interaction with the user, sending, from the first media device, an access request, including identifying information for a second media device, to the media server, which determines one or more recommended items of media content in response to the access request; and
providing the one or more recommended items of media content to the second media device, distinct from the first media device, identified by the identifying information in the access request, for playback at the second media device.

2. The method of claim 1, further comprising, providing notifications, to the user, that reflect the user's usage of the conversational messaging environment.

3. The method of claim 1, further comprising, providing statistics, to the user, that reflect the user's usage of a digital media content environment.

4. The method of claim 1, wherein the conversational messaging environment supports atypical or other user inputs in addition to text inputs, including the use of one or more emojis, and responds accordingly.

5. The method of claim 4, wherein each emoji or a plurality of emojis can be associated with a particular item of media content, and wherein use of a particular emoji of the one or more emojis during the interaction by the user in the conversational messaging environment is used to determine a particular item of media content associated with the particular emoji.

6. A system that provides access to digital media content within a conversational messaging environment, comprising:
a media server which can receive requests from media devices for media content;
a conversational agent provided within a conversational messaging environment displayed on a first media device, which operates according to a logic adapted to support an interaction with a user, wherein:
in response to the interaction with the user, the first media device sends an access request, including identifying information for a second media device, to the media server, which determines one or more recommended items of media content in response to the access request; and
the one or more recommended items of media content are provided to the second media device, distinct from the first media device, identified by the identifying information in the access request, for playback at the second media device.

7. The system of claim 6, further comprising, providing notifications, to the user, that reflect the user's usage of the conversational messaging environment.

8. The system of claim 6, further comprising, providing statistics, to the user, that reflect the user's usage of a digital media content environment.

9. The system of claim 6, wherein the conversational messaging environment supports atypical or other user inputs in addition to text inputs, including the use of one or more emojis, and responds accordingly.

10. The system of claim 9, wherein each emoji or a plurality of emojis of the one or more emojis can be associated with a particular item of media content, and wherein use of a particular emoji of the one or more emojis during the interaction by the user in the conversational messaging environment is used to determine a particular item of media content associated with the particular emoji.

11. A non-transitory computer readable storage medium, including instructions stored thereon which when read and executed by one or more computers cause the one or more computers to perform a set of steps comprising:

providing a media server which can receive requests from media device clients for media content;

providing a conversational agent within a conversational messaging environment, displayed on a first media device, which operates according to a logic adapted to support an interaction with a user;

in response to the interaction with the user, sending, from the first media device, an access request, including identifying information for a second media device, to the media server, which determines one or more recommended items of media content in response to the access request; and providing the one or more recommended items of media content to the second media device, distinct from the first media device, identified by the identifying information in the access request for playback at the second media device.

12. The non-transitory computer readable storage medium of claim 11, wherein the set of steps further comprises, providing notifications, to the user, that reflect the user's usage of the conversational messaging environment.

13. The non-transitory computer readable storage medium of claim 11, wherein the set of steps further comprises, providing statistics, to the user, that reflect the user's usage of a digital media content environment.

14. The non-transitory computer readable storage medium of claim 11, wherein the conversational messaging environment supports atypical or other user inputs in addition to text inputs, including the use of one or more emojis, and responds accordingly.

15. The non-transitory computer readable storage medium of claim 14, wherein each emoji or a plurality of emojis of the one or more emojis can be associated with a particular item of media content, and wherein use of a particular emoji of the one or more emojis during the interaction by the user in the conversational messaging environment is used to determine a particular item of media content associated with the particular emoji.

* * * * *